United States Patent
Charette et al.

(10) Patent No.: US 12,417,394 B2
(45) Date of Patent: Sep. 16, 2025

(54) SYSTEM AND METHOD FOR AI MODEL WATERMARKING

(71) Applicant: Huawei Cloud Computing Technologies Co., Ltd.

(72) Inventors: Laurent Charette, Vancouver (CA); Lingyang Chu, Burnaby (CA); Lanjun Wang, Toronto (CA); Yong Zhang, Richmond, CA (US)

(73) Assignee: Huawei Cloud Computing Technologies Co., Ltd., Guizhou (CN)

( * ) Notice: Subject to any disclaimer, the term of this patent is extended or adjusted under 35 U.S.C. 154(b) by 1219 days.

(21) Appl. No.: 17/204,935

(22) Filed: Mar. 17, 2021

(65) Prior Publication Data
US 2022/0300842 A1 Sep. 22, 2022

(51) Int. Cl.
*G06N 7/01* (2023.01)
*G06F 21/16* (2013.01)
*G06N 20/00* (2019.01)
*G06N 3/04* (2023.01)

(52) U.S. Cl.
CPC .............. *G06N 7/01* (2023.01); *G06N 20/00* (2019.01); *G06N 3/04* (2013.01)

(58) Field of Classification Search
CPC ................................. G06N 7/01; G06F 21/16
USPC .......................................................... 706/12
See application file for complete search history.

(56) References Cited

U.S. PATENT DOCUMENTS

| | | |
|---|---|---|
| 2019/0370440 A1 | 12/2019 | Gu et al. |
| 2020/0184044 A1 | 6/2020 | Zatloukal |
| 2020/0210764 A1* | 7/2020 | Hamedi ............... G06V 10/776 |
| 2021/0264161 A1* | 8/2021 | Saraee ................ G06F 18/2413 |
| 2021/0272011 A1* | 9/2021 | Yonetani ................ G06N 3/045 |
| 2021/0342490 A1* | 11/2021 | Briancon ................ G06F 21/14 |
| 2021/0344997 A1* | 11/2021 | Anderson ........ H04N 21/25891 |
| 2022/0308895 A1* | 9/2022 | Ben-Elazar ............ G06N 3/045 |

FOREIGN PATENT DOCUMENTS

| | | | | |
|---|---|---|---|---|
| CN | 112334917 A | * | 2/2021 | ........... G06F 21/554 |
| WO | WO-2022018736 A1 | * | 1/2022 | ............. G06F 21/16 |

OTHER PUBLICATIONS

Tang Yong et al.,"An algorithm of digital watermark based on auto-correlation function in the discrete wavelet transform domain",Yanshan University, vol. 31, No. 3, with an English abstract, total 6 pages. May 2015.

(Continued)

*Primary Examiner* — Ruay Ho (57) ABSTRACT

Method and system for watermarking prediction outputs generated by a first AI model to enable detection of a target AI model that has been distilled from the prediction outputs. Includes receiving, at the first AI model, a set of input data samples from a requesting device; storing at least a subset of the input data samples to maintain a record of the input data samples; predicting, using the first AI model, a respective set of prediction outputs that each include a probability value, the AI model using a watermark function to insert a periodic watermark signal in the probability values of the prediction outputs; and outputting, from the first AI model, the prediction outputs including the periodic watermark signal.

15 Claims, 9 Drawing Sheets

(56) References Cited

OTHER PUBLICATIONS

Jie Zhang et al., "Deep Model Intellectual Property Protection via Deep Watermarking",Journal of Latex Class Files, vol. 14, No. 8, total 14 pages. Aug. 2015.
Distilling the Knowledge in a Neural Network, Geoffrey Hinton et al, 9 pages, Mar. 9, 2015.
Entangled Watermarks as a Defence Against Model Extraction, Hengrui Jia et al., 18 pages, Feb. 19, 2021.
Deep Nerual Network Fingerprints by Conferrable Adversarial Examples, Nils Lukas et al., 18 paes, Jan. 20, 2021.
DAWN: Dynamic Adversarial Watermarking of Neural Networks, Sebastian Szyller et al., 16 pages, Jun. 18, 2020.

\* cited by examiner

Algorithm 1: Embedding signal in training a teacher model

Inputs : Teacher training data $X^T$ with one-hot encoded labels $Y^T$ and a watermark key $K = (i^*, f_w, v)$.

Output: Trained Watermarked model $R_w$.

1. Train $R_w$ using data $X^T$, labels $Y^T$ with the modified loss function Equation (4).
2. return Watermarked model $R_w$ with modified output $\hat{q}$ defined in Equation (3).

Algorithm 2: Extracting signal in a model

Inputs : A suspected model $S$,
Samples $\widetilde{X}_S$ of the training data of $S$,
A watermark key $K = (i^*, f_w, \mathbf{v})$ of the watermarked model $R_w$,
Filtering threshold value $q_{min}$.

Output: Signal strength.

1. Query $\widetilde{X}_S$ to $S$ and obtain outputs $\widetilde{Q}^S = \{\mathbf{q}^1, \ldots, \mathbf{q}^{\widetilde{L}}\}$.
2. Compute projections $\mathbf{p}_l = \mathbf{v}^\top \cdot \mathbf{x}^l$, for $l = 1, \ldots, \widetilde{L}$.
3. Filter out outputs where $\mathbf{q}^l_{i^*} \leq q_{min}$, remaining pairs form the set $\widetilde{D}^S = \{(\mathbf{p}_l, \mathbf{q}^l_{i^*})\}_{l=1,\ldots,\widetilde{M}}$.
4. Compute the Lomb-Scargle periodogram from the pairs $(\mathbf{p}_l, \mathbf{q}^l_{i^*})$ in $\widetilde{D}^S$.
5. Compute $P_{signal}$ and $P_{noise}$ by averaging spectrum values on frequencies inside and outside the window $[f_w - \frac{\delta}{2}, f_w + \frac{\delta}{2}]$, respectively.
6. Compute $P_{snr} = P_{peak}/P_{rest}$.
7. return Signal strength $P_{snr}$.

SYSTEM AND METHOD FOR AI MODEL WATERMARKING

RELATED APPLICATIONS

This is the first application for this disclosure.

FIELD

The present disclosure relates to artificial intelligence (AI) systems, and specifically systems and methods for AI model watermarking.

BACKGROUND

AI models are computer implemented algorithms that replicate decision processes. A machine learning (ML) model is a type of AI model that has been trained to perform a prediction task that maps an input sample to a label that belongs to a set of candidate labels. A machine learning algorithm can be used to generate an ML model based on sample data, known as training dataset, that can make predictions or decisions without being explicitly programmed to do so. In the case of supervised training, the training dataset will include data samples that have been pre-labelled with labels.

AI models are used to serve increasingly complex tasks. Supervised training of models that perform complex tasks can require large amounts of labeled data, which can be hard to produce or expensive to obtain. As a result, these models are very valuable to their owners. Entities owning such models might want to monetize their models by allowing clients to query the model's outputs through an Application Programming Interface (API) in exchange for a usage fee.

One of the recent development in AI is Machine Learning as a Service (MLaaS), where multiple machine learning services are offered through cloud computing. In one example of a MLaaS service, an entity may purchase access to ML models without the need to acquire the model or hire an expert to develop the same system in-house. Models accessible through an API constitute one form of MLaaS. Such models are already available for a variety of tasks (face recognition, optical character recognition, or text to speech, for example), and are offered by many major cloud computing services such as Huawei Cloud™, Amazon Web Services™, and Google Cloud™.

AI model owners would naturally want to protect their intellectual property and prevent fraud or theft in relation to their model. For example, a malicious agent might try to replicate the model and establish a competitor service, which could dramatically reduce the profitability of an API service. One such model replication method, model distillation, allows a user to essentially replicate a model given access to only its outputs and a set of unlabeled data.

Model distillation is a method that allows a model to be trained using unlabeled data, provided access to an already trained built to perform the same task. The trained model is known as the teacher model R, while the untrained model is known as the student model S.

As a substitute to labels of the training data, model distillation uses the outputs of R. The output vector q of R is a softmax function of its logits z, $$q_i = \frac{e^{z_i/T}}{\sum_j e^{z_j/T}},$$

where i,j denote the index value of a specific class. The unlabeled data set X is fed through R and the obtained outputs make a set of pseudo-labels Y.

The student model S is trained to have its softmax outputs p for X as close to q∈Y as possible. This can be achieved by minimizing cross-entropy with the pseudo-labels $q_j$ $$L = \Sigma_j q_j \log p_j.$$

If R and S have similar capacity, the two models' outputs can become very close. Thus, model distillation can be used to replicate a model without access to labeled data.

As a more specific example, a malicious agent might use a Cloud Face Recognition service to access a proprietary face recognition model, then distil a student model through the API in contravention of use rights of the service provider. Once the model has been distilled, it is in full possession of the malicious agent, and they can then decide to make it available as another service, coming into competition with the original service. The original service provider would benefit from being able to prove that the competing service is based on a distillation of their own model. Such proof can allow the original service provider to take legal or other suitable actions to counter the malicious agent's unauthorized activities.

A variation of model distillation is when a model is distilled from an ensemble of different models. In this situation the distilled model is trained on an aggregate of the outputs of the different teacher models. The most common way to do this is to take the average outputs of the models. Using an ensemble of models has the effect of mitigating some of the misclassified inputs of each individual model and often results in better performing distilled models.

Model watermarking solutions have been proposed as a countermeasure to unauthorized model distillation activities. A model watermark is a piece of information that is embedded in a ML model with the intended purpose of determining ownership. The watermarking framework consists of two phases: watermark embedding, where the watermark is inserted into the model, and watermark extraction, where the watermark is detected and identified in another model. Watermark embedding requires a modification to the model, compared to another non-watermarked model. This modification should be tuned to be small enough for the model to retain its performance, but significant enough to be reliably detected during extraction.

One known model watermarking solution is Dynamic Adversarial Watermarking of Neural Networks (DAWN), described for example in the document: [Sebastian Szyller, Buse Gul Atli, Samuel Marchal, and N. Asokan. DAWN: Dynamic Adversarial Watermarking of Neural Networks. rXiv:1906.00830v4 [cs.CR] 18 Jun. 2020]. DAWN creates adversarial examples by changing the prediction label of a small fraction of API queries. Inputs that are among the inputs whose labels have been changed are used as the watermark, along with their incorrect labels. However, this solution lack effectiveness against an ensemble distillation attack, may lead to false ownership claims, and relies on a randomly generated, non-customizable watermark.

Another watermarking solution is entangled watermarks, which assigns tagged training images to incorrect labels and preserves this property through to student models through entanglement, described for example on the document: [Hengrui Jia, Christopher A. Choquette-Choo, and Nicolas Papernot, Entangled Watermarks as a Defense against Model Extraction. arXiv:2002.12200v1 [cs.CR] 27 Feb. 2020. Such a solution may in some applications have low accuracy for more complicated datasets and model architectures (residual networks on RGB images, for example).

There is a need for a customizable and accurate model watermarking solution that allows a model's owner to identify other models that have been obtained through replication methods such as model distillation and ensemble model distillation.

SUMMARY

According to a first example aspect, a method is disclosed for watermarking prediction outputs generated by a first AI model to enable detection of a target AI model that has been distilled from the prediction outputs. The method comprises: receiving, at the first AI model, a set of input data samples from a requesting device; storing at least a subset of the input data samples to maintain a record of the input data samples; predicting, using the first AI model, a respective set of prediction outputs that each include a probability value, the AI model using a watermark function to insert a periodic watermark signal in the probability values of the prediction outputs; and outputting, from the first AI model, the prediction outputs including the periodic watermark signal.

In at least some applications, the above method allows a unique watermark to be added to model that can be transferred to a distilled model and accurately detected in prediction outputs generated by the distilled model, even where the distilled model has been distilled from multiple teacher models.

In an example method of the first example aspect, the periodic watermark signal is configured to cause an AI model that is distilled from the respective set of prediction outputs to insert a periodic signal into prediction outputs of the AI model that can be detected as matching the periodic watermark signal.

In an example method of any of the preceding examples of the first example aspect, the method includes, prior to the predicting, including the watermark embedding function in a preliminary AI model to generate the first AI model.

In an example method of any of the preceding examples of the first example aspect, the preliminary AI model is an untrained model, the method comprising training the preliminary AI model using a loss that is based on the outputs of the preliminary AI model with the included watermark embedding function.

In an example method of any of the preceding examples of the first example aspect, the method includes, defining a key corresponding to the watermark embedding function, the key including a random projection vector, wherein the watermark function inserts the periodic watermark signal based on the random projection vector.

In an example method of any of the preceding examples of the first example aspect, the method includes, determining if a target AI model has been distilled from the first AI model by: submitting a query to the target AI model that includes at least some of the stored subset of the input data samples; receiving a prediction outputs from the target AI model corresponding to the input data samples; and determining, based on the key, if a periodic signal that matches the periodic watermark signal can be detected in the prediction outputs from the target AI model.

In an example method of any of the preceding examples of the first example aspect, the key further includes information that identifies a frequency of the periodic watermark signal and a target prediction output to monitor for the periodic watermark signal.

According to a second example aspect is a method for providing an AI model, comprising including an watermark embedding function that modifies softmax outputs of a softmax layer of the AI model, the embedding function being configured to insert a periodic watermark signal into a set of prediction outputs generated by the AI model in respect of a set of input data samples.

According to a third example aspect is a method of determining if a target AI model has been distilled from a first AI model by: submitting a query to the target AI model that includes input data samples that were previously provided to the first AI model; receiving a prediction outputs from the target AI model corresponding to the input data samples; and determining, based on predetermined key, if a periodic signal that matches a known periodic watermark signal can be detected in the prediction outputs from the target AI model.

In some example of the third aspect, the determining comprises: determining, based on a Fourier power spectrum of the prediction outputs and a projection vector included in the predetermined key, if a signal power that corresponds to the frequency of the known periodic watermark signal can be detected in the prediction outputs from the target AI model.

According to a further example aspect a computer system is disclosed comprising one or more processing units and one or more non-transient memories storing computer implementable instructions for execution by the one or more processing devices, wherein execution of the computer implementable instructions configures the computer system to perform the method of any one of the preceding aspects.

According to a further example aspect, a non-transient computer readable medium is disclosed that stores computer implementable instructions that configures a computer system to perform the method of any one of the preceding aspects.

BRIEF DESCRIPTION OF THE DRAWINGS

Reference will now be made, by way of example, to the accompanying drawings, which show example embodiments of the present application, and in which.

Similar reference numerals may have been used in different figures to denote similar components.

DESCRIPTION OF EXAMPLE EMBODIMENTS

An AI model watermarking system and method is disclosed that embeds a watermark function into a model so that the model will embed an identifiable periodic watermark signal in prediction outputs that it generates. The watermark signal may persists even through averaging the outputs of assembled teacher models, and thus can be used to detect both single model and ensemble model distillation attacks. In some examples, the periodic watermark signal has a small amplitude that does not impact model performance yet enables it to be smoothly coupled with a Kullback-Leibler (KL) divergence during a distillation process to allow easy extraction of an identifiable watermark signal.

Figure 1:
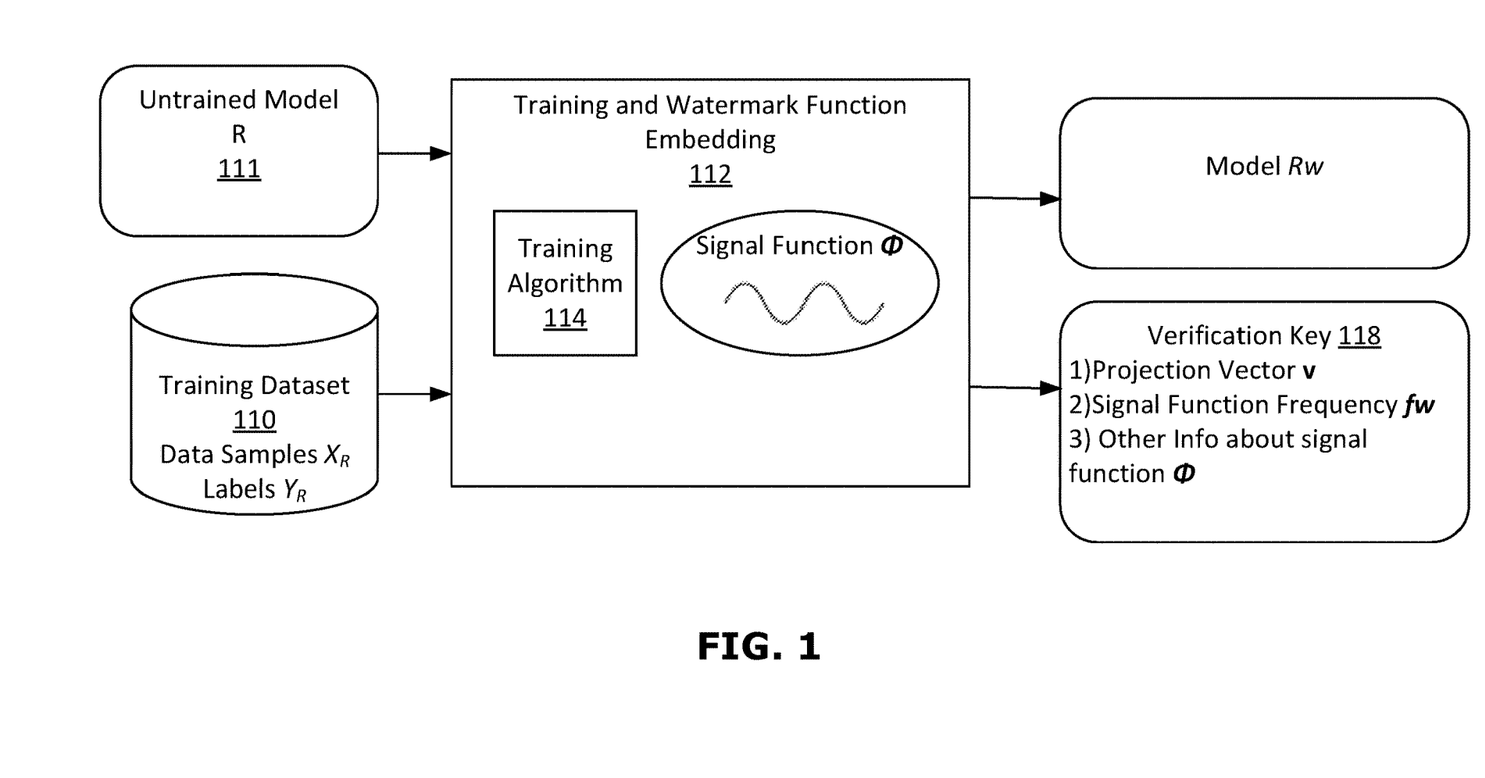
FIG. 1 is a block diagram showing a model training and watermark function embedding module according to example aspects of this disclosure.

FIG. 1 illustrates a watermark function embedding operation that can be performed to embed a watermark function $\phi$ into an AI model $R_w$, which in the illustrated example is an ML model. In the example of FIG. 1, the watermark function embedding is performed during supervised training of the model $R_w$ using a joint training and watermark function embedding module 112. As used here, a "module" can refer to a combination of a hardware processing circuit and machine-readable instructions (software and/or firmware) executable on the hard-ware processing circuit. A hardware processing circuit can include any or some combination of a microprocessor, a core of a multi-core microprocessor, a microcontroller, a programmable integrated circuit, a programmable gate array, a digital signal processor, or another hardware processing circuit.

In some examples, model $R_w$ is a multi-layer neural network (NN) model that includes an input layer, intervening hidden layers, an output layer and a softmax layer. An input data sample is provided the input layer as an input feature map. A feature map can be a tensor of values such as a vector or matrix of values where the magnitude of the value and the position of the value in the tensor conveys meaning. The model $R_w$ is trained to perform a prediction task T that will map the input data sample to a prediction output that is included in a respective set of candidate prediction outputs. In the following disclosure, a prediction output is referred to as a label and a set of candidate prediction outputs is referred to as a set of candidate labels. Each label corresponds to a respective possible prediction output outcome for the model R. In the case where the prediction task T is a classification task, each of the labels may be a class label that corresponds to a respective class from a set of candidate classes that an input sample can be classified as belonging to.

The output layer of model $R_w$ generates a set of logits consisting of unbounded real values. Each logit represents a respective one of the candidate labels, and the value of each logit indicates a probability that the candidate label corresponds to the input data sample. The softmax layer performs a softmax function that normalizes the output layer logits as respective softmax output probability values between 0 and 1 that sum up to 1. The candidate label represented by the softmax output having the highest probability value is selected as the output label for the input data sample. In examples, the label (e.g., the predicted outcome) that is output by the model $R_w$ includes a label identifier and the softmax probability (e.g., a normalized value between 0 and 1) for that label.

In the example of FIG. 1, the training and watermark function embedding module 112 is provided with a training dataset 110 that includes set of data samples $X_R = \{x^1, \ldots, x^N\}$ that have associated labels $Y_R = \{y^1, \ldots, y^N\}$. Training and watermark function embedding module 112 receives as inputs information that defines an untrained model 111 and labeled training dataset 110. Training and watermark function embedding module 112 generates a trained and watermarked model $R_w$ with a verification key 118 that can be used for a future watermark extraction process. "Watermarked model" refers to a model that is embedded with a watermark function $\phi$ that will insert a watermark signal in an output dataset of multiple labels generated in respect of an input sample dataset (e.g., a new dataset provided to the model post-training for a prediction task). In example embodiments, the watermark signal is inserted in the predicted probabilities values (e.g., the softmax probability) that are included with the labels generated by the trained model $R_w$.

The verification key 118 consists of a projection vector v, a watermark signal frequency $f_w$, and optionally other information about the watermark signal, such as target class, phase, and amplitude information. In the embodiment of FIG. 1, part of the watermark function embedding is performed by a training algorithm 114 when training the model $R_w$, which is why untrained model 111 is used as input. In alternative examples, a non-watermarked trained model could be used as input, and the training could then be considered as a fine-tuning step.

Figure 2:
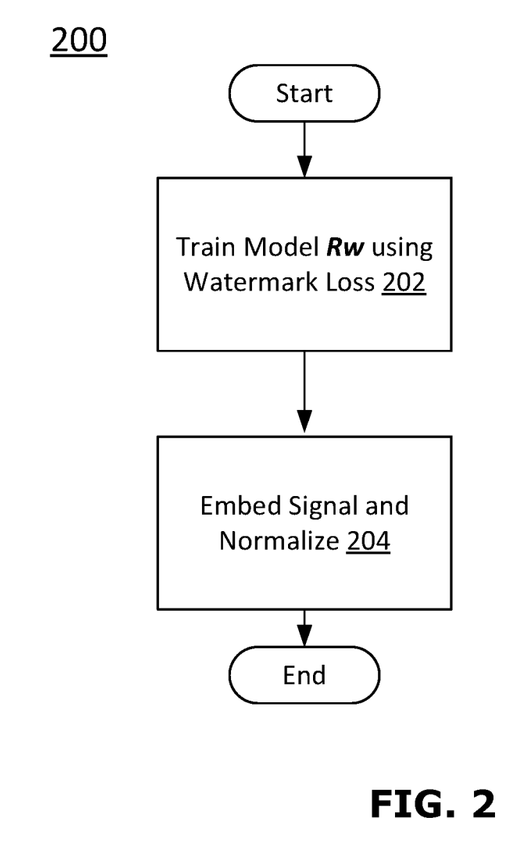
FIG. 2 is a block diagram of a process performed by the model training and watermark function embedding module of FIG. 1.

With reference to FIG. 2, a training and function embedding process 200 performed by training and watermark function embedding module 112 can include two parts, which will both be described in greater detail below. First, as indicated at 202, training algorithm is used to train model $R_w$ for a prediction task T using the labeled training dataset 110. During training, a modified cross-entropy loss function is used that accounts for the softmax output embedded with the watermark function $\phi$ using projections of the input features from projection vector v. Second, as indicated at 204, the watermark function $\phi$ is embedded in the model $R_w$ by adding the watermark function $\phi$ after the softmax layer of training Model R. In an example, the watermark function $\phi$ adds a value sampled from a periodic watermark signal to each of the softmax layer probability value outputs predicted for an input sample. A further normalization operation is added to the Model R that re-normalizes the modified softmax outputs to between 0 and 1 with a total sum of 1. Over a set of successive input samples, the periodic watermark signal will be inserted in the respective set of predicted labels.

These steps will now be described in greater detail. The training and watermark function embedding 112 is configured to embed a watermark function $\phi$ in Model $R_w$ that will introduce a periodic perturbation to the outputs of the model $R_w$ so that the perturbation will be transferred onto the outputs of a student model (model 5) that is distilled either from model $R_w$ on its own or from model $R_w$ and other trained models (e.g., through ensemble model averaging distillation). In effect, the distilled student model will unknowingly also be embedded with a copy of watermark function $\phi$.

Figure 3:
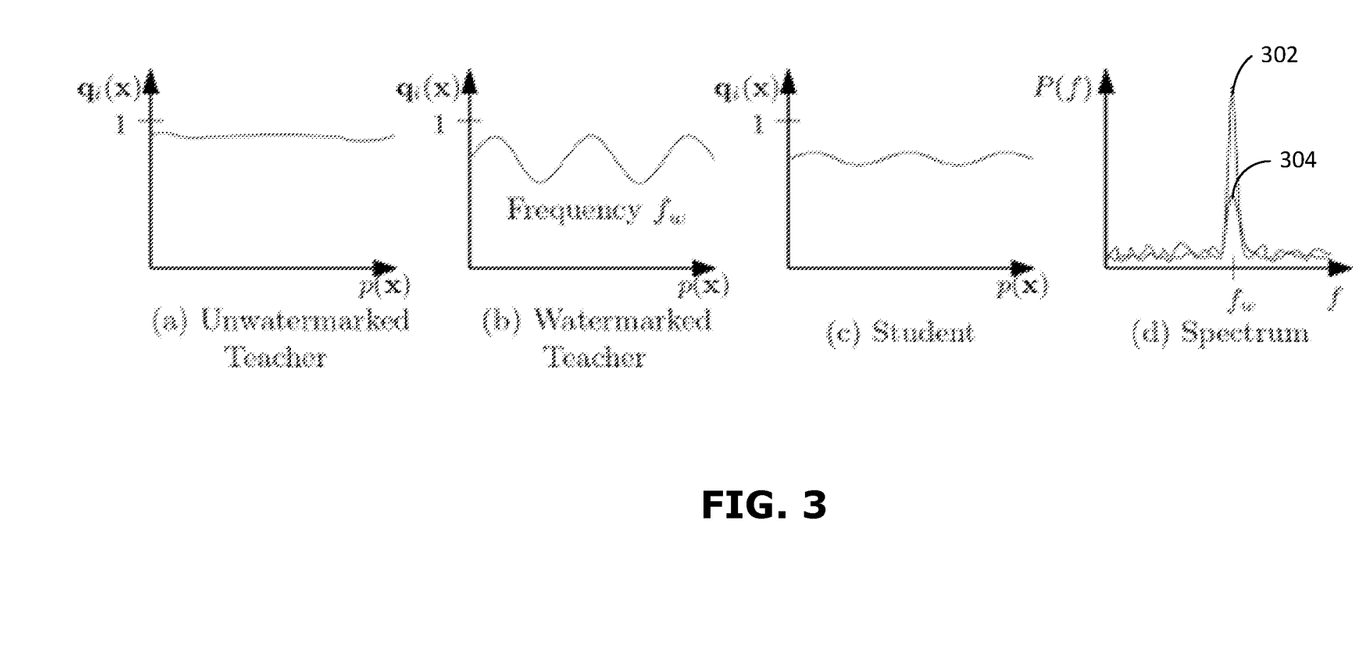
FIG. 3 illustrates embedding and extraction of a watermark signal by a model according to example embodiments.

An illustration of this embedding concept is shown FIG. 3, which shows the effects of a periodic watermark signal that is introduced in a model output signal ($q_t$). In the example of FIG. 3, each signal $q_i$ represents output values of a respective model, or of a model ensemble, for a label class i. Plot (a) illustrates a non-watermarked teacher model R; it will be noted that there is no periodic behavior in output signal $q_i$ for label class i. Plot (b) illustrates the output signal $\hat{q}$ of a watermarked teacher model $R_w$ that is embedded with watermark function $\phi$. Function $\phi$ inserts a periodic perturbation of frequency $f_w$ into teacher model $R_w$ outputs, resulting in a periodic oscillations in the output signal $q_i$ for label class i. If the perturbation is small enough, the model predictions should be mostly unaffected and the effect of the watermark on the model's performance would be minimal. As shown at plot (c), a student model trying to replicate the behavior of the teacher model will also feature a similar oscillation at the same frequency $f_w$.

In addition, even if the case of an averaging effect of an ensemble of teacher models on the outputs, the periodic watermark signal should still be present in the student output signal $q_i$ in some form. Since the averaging is linear, the amplitude of the watermark signal would be diminished by a factor of the number of the ensemble models. Plot (d) illustrates the application of a Fourier transform on the output signals of the teacher model (larger signal 302) and the student model (smaller signal 304) in the ensemble teacher model case, where one of the teacher models includes a watermark signal. By applying a Fourier transform, the perturbation introduced by the watermark signal can be identified by the presence of a peak in the power spectrum at the frequency $f_w$ as shown in Plot (d).

Accordingly, in the example of FIG. 1, a periodic watermark function $\phi$ is embedded in model $R_w$ so that in future inference tasks the model $R_w$ will insert a periodic watermark signal in an output dataset without affecting the performance of the teacher model R significantly. Normally, an output q of a model R without the watermark function for a given data sample x is specifically calculated directly from the softmax of the logits $z = \mathbb{R}^m$, i.e., $$q_i = \frac{e^{z_i}}{\sum_{j=1}^{m} e^{z_j}}, \text{ for } i = 1, \ldots, m. \tag{1}$$

Where output q is a softmax of the logit outputs z of a model R, then the following property must exist:

1. $1.0 \leq q_i \leq 1$ for $i=1, \ldots, m$.

2. $\Sigma_{i=1}^{m} q_i = 1$.

In order to enable watermarking, the softmax output q needs to be modified into a modified output $\hat{q} \in \mathbb{R}^m$ that features the periodic watermark signal and satisfies the above property. Then the modified output $\hat{q}$ can serve as a substitute to q in the model inference. However, directly modifying q in the model inference by itself may degrade the performance of the model R. In order to mitigate this effect, the modified output $\hat{q}$ is also used while training model $R_w$. As part of the watermark function embedding process, a watermark key K is first defined that includes: a target class $P \in \{1, \ldots, m\}$, a watermark signal frequency $f_w \in \mathbb{R}$, and a random unit projection vector $v \in \mathbb{R}^m$, i.e., $K=(i^*, f_w, v)$. The target class may for example correspond to a prediction output that is known to have a relatively high rate of occurrence in order to increase the number of watermarked output labels. Based on information included in watermark key K, a periodic signal sampling function can be defined as:

$$a_i(x) = \begin{cases} \cos(f_w p(x)), & \text{if } i = i^*, \\ \cos(f_w p(x) + \pi), & \text{otherwise,} \end{cases} \tag{2}$$

for $i \in \{1, \ldots, m\}$, where $p(x) = v^T x$.

where the p is the projection of input data sample x onto projection vector v.

In the illustrated example, linear projections are used as they are simple one dimensional functions of the input data. This leads to a large-dimensional space to select projection vector select v from, and generally little interference between two arbitrary choices of projection vector v. As a consequence, a large choice of watermark signals is available, and each watermark signal is concealed to arbitrary projections. This allows a model owner to have a unique watermark signal that they can prove originates with that owner.

An embedding function that can modify the softmax layer and inject the periodic watermark signal into model softmax output q to obtain output $\hat{q}$ can be done as follows:

$$\hat{q}_i = \begin{cases} \dfrac{q_i + \varepsilon(1 + a_i(x))}{1 + 2\varepsilon}, & \text{if } i = i^*, \\ \dfrac{q_i + \dfrac{\varepsilon(1 + a_i(x))}{m - 1}}{1 + 2\varepsilon}, & \text{otherwise,} \end{cases} \tag{3}$$

where $\varepsilon$ is an amplitude component for the periodic watermark signal. It will be noted that the magnitude of the target class prediction output is modified more than the other possible prediction outputs.

If output q is modified into output $\hat{q}$ only during post-model training inference, the model prediction performance can be degraded by the perturbation. Accordingly, in examples, the modified output $\hat{q}$ is also used in training to compensate the potential performance drop. To do that, output q is directly replaced by output $\hat{q}$ in the cross-entropy loss function used by training algorithm 114 during training of model $R_w$. Specifically, for the data sample x with a one-hot encoding true label $y^t \in \mathbb{R}^m$ the cross-entropy loss during training can be replaced by $$L_{CE,wm} = -\sum_{j=1}^{m} y_j^t \log(\hat{q}_j). \tag{4}$$

Figure 4:
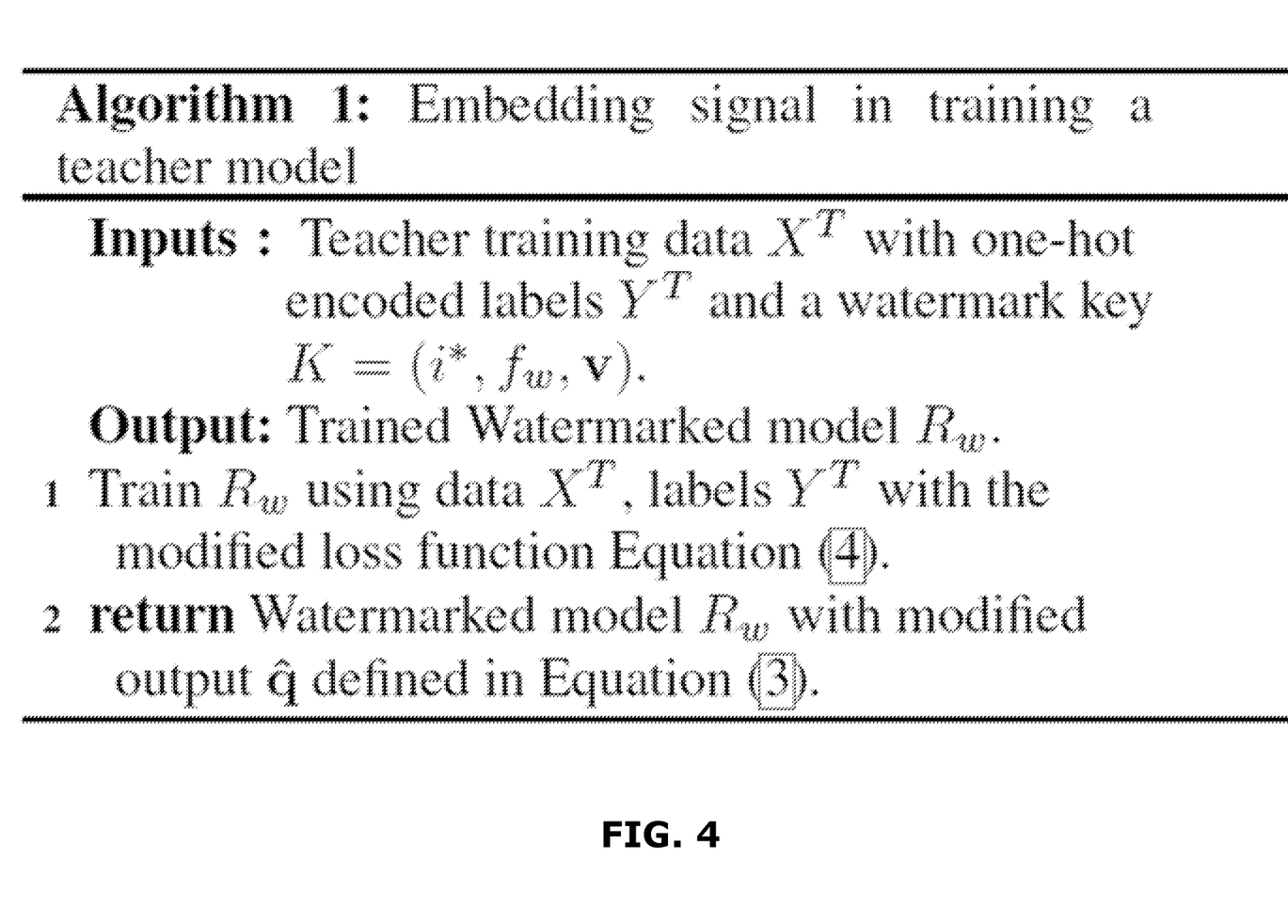
FIG. 4 is a pseudocode representation of an algorithm implemented by the model training and watermark function embedding module of FIG. 1 to implement the process of FIG. 2.

Accordingly, the watermark signal function $\phi$ is added to the untrained model (e.g., after or into the softmax layer) and the model is then to incorporate the effects of the watermark signal function $\phi$ into the inference process of trained model $R_w$. This ensures that the watermark signal will be present in every output, even for input data samples that are not used during training. This can results in a clear signal function in the teacher model $R_w$'s outputs that will be harder to conceal by noise caused by distillation training or by dampening due to ensemble averaging. A pseudocode representation of the operation of training and watermark function embedding module 112 is summarized in Algorithm 1 of FIG. 4 that references the above equations (3) and (4).

Figure 5:
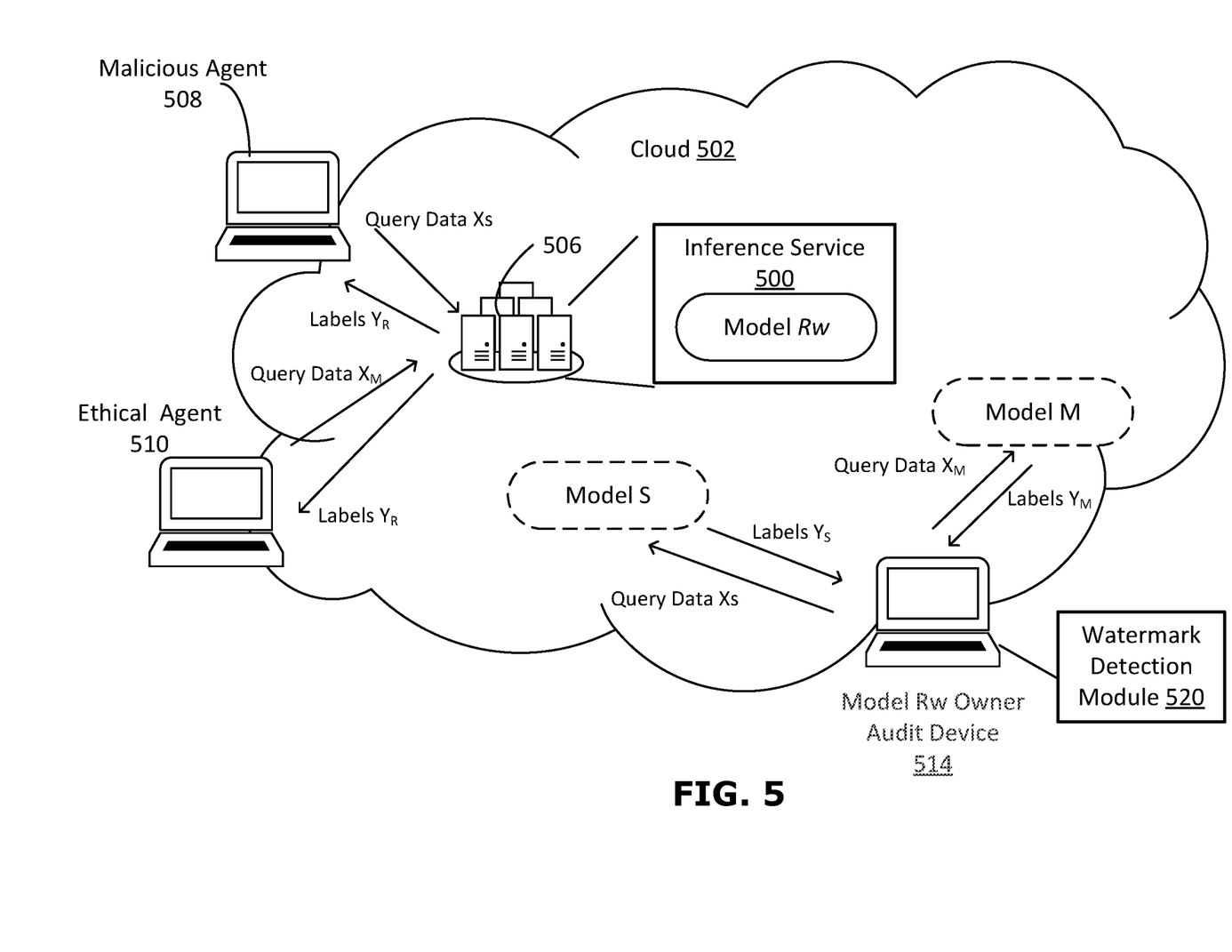
FIG. 5 is a block diagram of an example embodiment in which watermark signal embedding and detection operations can be performed, according to example embodiments.

In examples, model $R_w$ is provided as a cloud inference service. FIG. 5 illustrates an example of an environment in which systems and methods of the present disclosure may be applied. A cloud computing system 506 hosts an inference service 500 that is configured to receive query datasets X that include multiple query data samples x through a cloud network 502 (e.g., network that includes the Internet and/or an enterprise intranet) from user devices 508, 510 and perform inferences on the query data samples x to generate label predictions that are transmitted back to the requesting user devices 508, 510. Cloud computing system 506 can include one more cloud devices (for example a cloud server or a cluster of cloud servers) that have extensive computational power made possible by multiple powerful and/or specialized processing units and large amounts of memory and data storage. User devices 508, 510 may for example be computing devices or systems that are connected to the cloud network 502.

In the example of FIG. 5, cloud computing system 506 supports inference service 502 by hosting model $R_w$ and possibly other specialized inference models. Model $R_w$ may be configured to perform different prediction tasks in different applications. For example model $R_w$ may be configured to perform a task selected from the group of, but not limited to: image classification; object detection; text-to-speech conversion; speech recognition; and optical character recognition, among others.

As illustrated in FIG. 5, user devices can be operated by malicious agents (user device 508) and by ethical agents (user device 510). In the illustrated example, malicious agent submits a query dataset Xs to inference service 500 and receives back a set of respective labels $Y_R$ generated by model $R_w$. The malicious agent breaks its terms of use with the inference service 500 and uses the query dataset Xs and resulting label set $Y_R$ to distill a competing model, Model S, that malicious agent then uploads to a competing inference service in cloud network 502. In some examples, Model S may be an ensemble average model that has been generated based on queries and resulting labels from multiple inference services that are operated by different entities and use independent models.

In the illustrated example, ethical agent also submits a respective query dataset $X_M$ to inference service 500 and receives back a set of respective labels $Y_R$ generated by model $R_w$. At some point in the future, ethical agent decides to launch a competing model, Model M, using a competing inference service in cloud network 502. The ethical agent builds its own Model M independently without relying on label set $Y_R$ generated by model $R_w$.

The entity that owns model $R_w$ maintains a database of the query data sets Xs, $X_M$ received from requesting user devices 508, 510 along with data identifying the requesting user devices. The query datasets (or subsets thereof) may for example be retained according to terms set out in a terms of use agreement between the respective parties. At some point in the future, model $R_w$ owner becomes aware of competing model S and competing Model M, and wants to determine if they are malicious models that have been distilled from model $R_w$ or are legitimate, independently created models. In some examples, model $R_w$ owner may license model $R_w$, and may want to determine if a competing model is an authorized version of model $R_w$.

Accordingly, in examples the model $R_w$ owner has access to a computing system configured to function as a model audit device 514. Model audit device 514 may be part of cloud computing system 506 or may be hosted on a different system that is connected to cloud network 502. Model audit device 514 includes a watermark detection module 520 that is configured to query models such as model S and model M to evaluate if such models are based on unauthorized distillations of model $R_w$. In this regard, watermark detection module 520 uses data samples from the previously stored query dataset $X_S$ to query model S and retrieve label set $Y_S$, and from previously stored query dataset $X_M$ to query model M and retrieve label set $Y_M$. Watermark detection module 520 is configured to determine, based on watermark key K, if the watermark signal function that was embedded into Model Rw has been replicated into an audited model.

Figure 6:
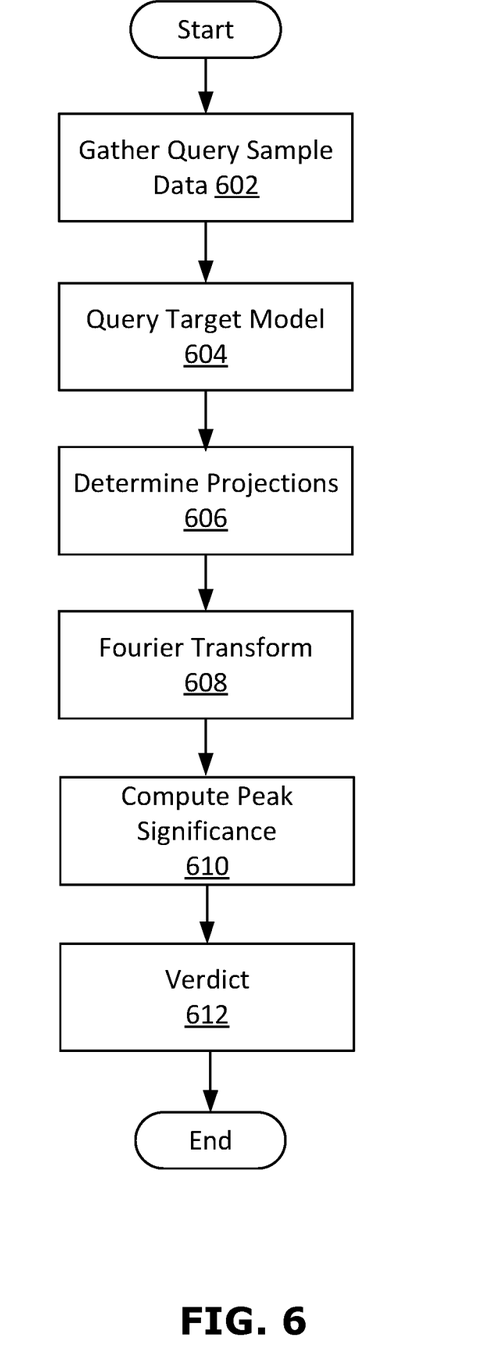
FIG. 6 is a block diagram of a watermark signal extraction and evaluation process performed by a watermark detection module according to examples.

In this regard, FIG. 6 illustrates a block diagram of a process executed by watermark detection module 520, according to examples of this disclosure. As indicated at 602, the watermark detection module 520 builds an audit query dataset $\hat{X}^S=\{x^1, \ldots, x^{\hat{L}}\}$ query data samples for model (e.g., Model S). Audit query dataset $\hat{X}^S$ can be acquired from data samples included the original query dataset Xs submitted by malicious agent device 508. In some examples, query dataset $\tilde{X}^S$ should include at least 200 samples for detection of a basic single teacher model distillation and at least 1,000 samples for complex detection cases such as when multiple teacher models have been accessed for ensemble averaging model distillation cases. In examples, the query samples included in the audit query dataset are ordered successively in the same order as used in the original query dataset to assist detection of the periodic signal watermark.

As indicated at 604, the target model S is then queried using the query dataset $\tilde{X}^S$. The output label set of the target model S for data query dataset $\tilde{S}^S$ can be denoted as $\hat{Q}^S=\{q^1, \ldots q^{\hat{L}}\}$ where $q^l \in \mathbb{R}^m$ for l=1, \ldots, $\hat{L}$. Each output q includes a label identifier and the softmax probability value generated by the target model S for that label.

As indicated at 606, projections are determined. In particular the query samples in the data query dataset $\tilde{S}^S$ are projected onto the projection vector v included in the watermark key K of model $R_w$. In particular, for each (query sample, label pair)=$(x^l, q^l)$, a respective result pair $(p_l, q_{i*}^l)$ is extracted, where $p_l$ corresponds to linear projection $p_l = v^T x^l$ as per equation (3), and i* is the target class of model $R_w$ for embedding watermark signals. The result pairs $(p_l, q_{i*}^l)$ for which is less than a minimum threshold $(q_{i*}^l \le q_{min})$ are filtered out to remove misclassified and low confidence outputs. The threshold value $q_{min}$ is a defined constant parameter of the extraction process. After filtering, the $\tilde{M}$ remaining pairs are re-indexed into an evaluation set $\tilde{D}^S\{(p_l, q_{i*}^l)\}_{l=, \ldots, \tilde{M}}$.

As indicated in 608, the pairs $(p_l, q_{i*}^l) \in \tilde{D}^S$ are then used to compute the Fourier power spectrum, for evenly spaced frequency values spanning a large interval containing the frequency $f_w$. The independent variable for the transform is the projections p and the dependent variable is the output label softmax probability value in q.

It will be noted that a separate transform can be computed for each possible label outcome class of training data, but the target class i* for which the watermark signal will be stronger will typically be chosen for verification. Furthermore, signal frequency $f_w$ could be recovered from analysis of the output q if it was unavailable. According, in some examples, the watermark K may only need to include the projection vector v. However, inclusion of the target class and signal frequency information can improve accuracy and speed up the watermark detection process.

To compute the transform from discrete data points a numerical method, like the Lomb-Scargle periodogram, can be applied which approximates the power spectrum of the transform. (See for example, reference: [Jeffrey D Scargle. Studies in astronomical time series analysis. ii-statistical aspects of spectral analysis of unevenly spaced data. The Astrophysical Journal, 263:835-853, 1982]).

As indicated at 610, a peak significance is then computed. Power spectrum data is gathered in a fixed, small window around the watermark signal frequency $f_w$ of the signal function $\phi$, and a signal to noise ratio computation is performed between the window spectrum values and the spectrum values gathered outside of the small window.

In an illustrative examples, in order to measure the signal strength of the watermark signal, a wide frequency band F is defined and a small window within the frequency band F is defined as:

$$\left[f_w - \frac{\delta}{2}, f_w + \frac{\delta}{2}\right]$$

where $\delta$ is a parameter for the half-width of the window and $f_w$ is the frequency of the watermarking signal applied by model $R_w$. A signal power $P_{signal}$ and noise power $P_{noise}$ are then calculated by averaging spectrum values P(f) on frequencies inside and outside the window, i.e., $$P_{signal} = \frac{1}{\delta}\int_{f_w - \frac{\delta}{3}}^{f_w + \frac{\delta}{3}} P(f)df \text{ and } P_{noise} = \frac{1}{F - \delta}\left[\int_0^{f_w - \frac{\delta}{2}} P(f)df + \int_{f_w + \frac{\delta}{2}}^{F'} P(f)df\right],$$

respectively. A signal-to-noise ratio can then be calculated to measure the signal strength of the periodic signal, i.e.

$$P_{STVF} = P_{signal}/P_{noise}. \quad (5)$$

This enables a periodic signal of frequency $f_w$ to be identified, which is indicative that the periodic signal is a match of the original watermark embedding signal.

Figure 7:
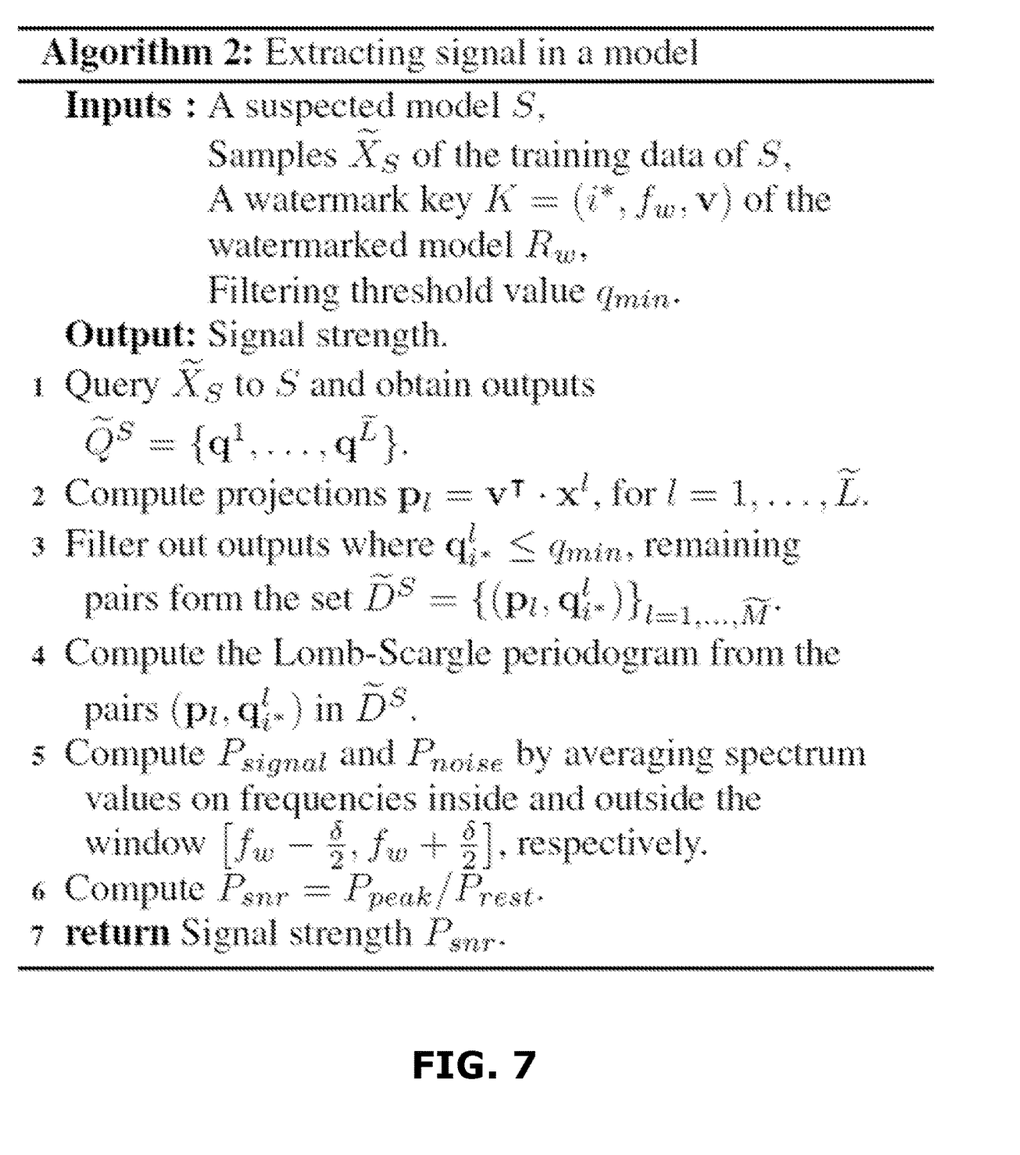
FIG. 7 is a pseudocode representation of an algorithm implemented by the watermark detection module to implement the process of FIG. 6.

The process performed by watermark detection module 520 is summarized as pseudocode in FIG. 7 as Algorithm 2.

In example embodiments, the query dataset $\tilde{X}^S = \{x^1, \ldots, x^L\}$ can include data for multiple target models that are audited, and the results for the different models ranked. The higher ranked models would have a higher probability than lower ranked models as being distilled from owner's model $R_w$. In some examples, the query dataset $\tilde{X}^S = \{x^1, \ldots, x^L\}$ may be customized for each model to avoid providing one user's query data to another user's model.

In some examples, a threshold value may be set for equation (6) that is used to flag suspicious models for further action.

Thus, the signal strength of the watermark signal

As indicated at 612, a verdict on the audited models can be output by watermark detection module 520.

In embodiment 2, the watermark function embedding module takes in a fully trained model R. The training step of the embedding module is then bypassed and must be performed by the user beforehand.

As noted above, in an alternative example of training and watermark function embedding module 112, the module is configured to embed a watermark signal function into an already trained model. Such a configuration takes in a trained model and returns a trained watermarked model with a verification key that would be used during watermark extraction.

The watermarking systems and methods disclosed herein may provide one or more of the following beneficial properties in at least some applications. watermarking frameworks that achieves the following properties. High accuracy: the watermark extraction process may, in many cases, identify student models from independently trained models with high accuracy. High customizability: the owner of the watermarked model should be identifiable by a watermark signal that was specifically designed to or by them. High robustness: the watermark should be detectable even if the suspected model was distilled by an ensemble of teacher models, one of which bearing the watermark. High generality: the watermark model should be applicable to a variety of different models architectures and for different classification tasks.

In summary, the disclosure provides a watermarking systems and methods framework that may, in at least some applications, accurately identify student models, produces highly customizable watermarks, works on student models generated from an ensemble of teachers, and be adapted for many different models and tasks.

Figure 8:
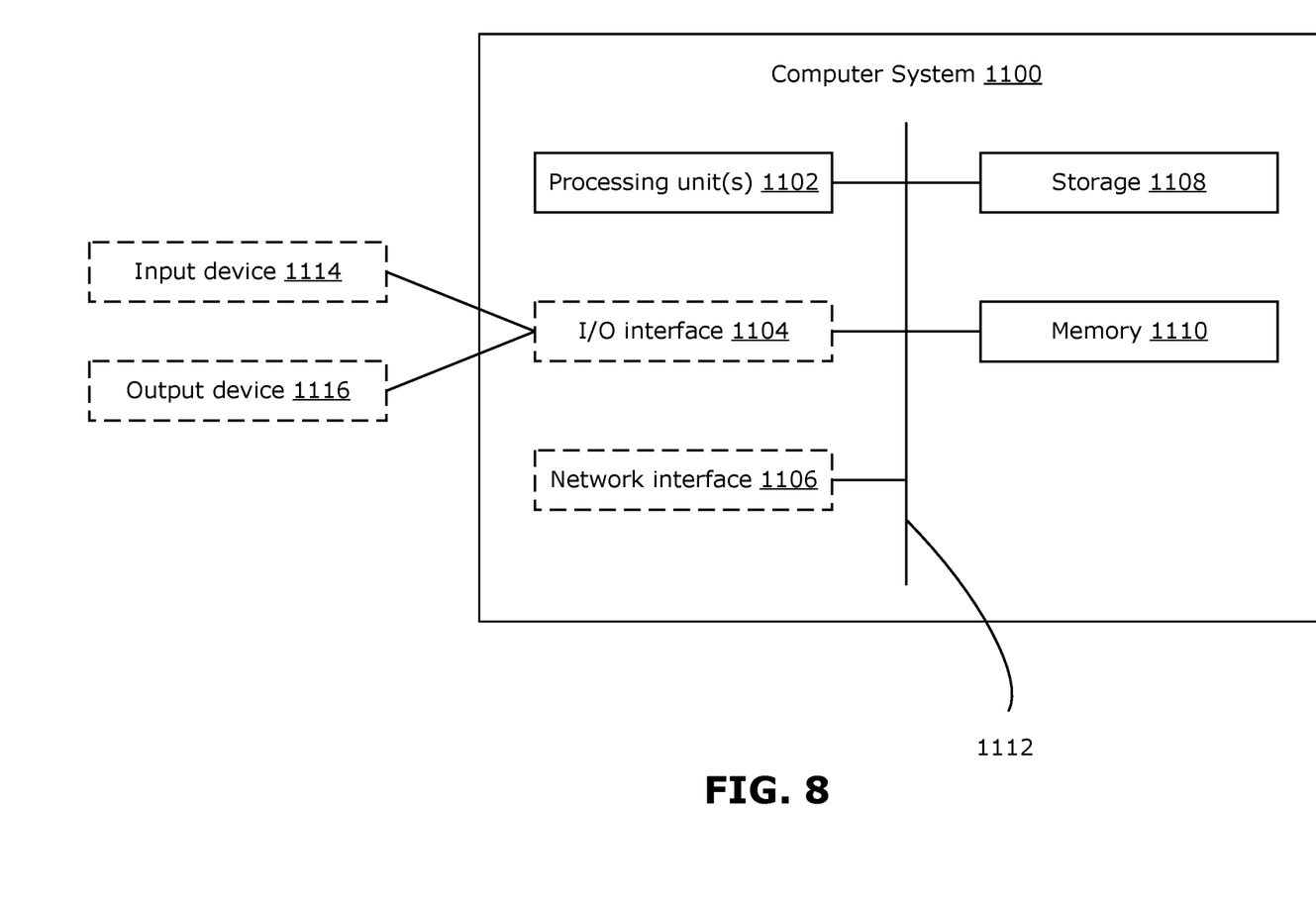
FIG. 8 is a block diagram illustrating an example computer system that can be used to implement systems and methods disclosed herein.

FIG. 8 is a block diagram of an example simplified computer system 1100, which may be part of a system or device that can be used to implement one or more of the functions, modules, models, systems and/or devices described above, including on or more of cloud computer system 506, audit device 514, training and watermark embedding module 112, watermark detection module 520 and Model $R_w$. Other computer systems suitable for implementing embodiments described in the present disclosure may be used, which may include components different from those discussed below. Although FIG. 8 shows a single instance of each component, there may be multiple instances of each component in the computer system 1100.

The computer system 1100 may include one or more processing units 1102, such as a processor, a microprocessor, an application-specific integrated circuit (ASIC), a field-programmable gate array (FPGA), or combinations thereof. The one or more processing units 1102 may also include other processing units (e.g. a Neural Processing Unit (NPU), a tensor processing unit (TPU), and/or a graphics processing unit (GPU)).

Optional elements in FIG. 8 are shown in dashed lines. The computer system 1100 may also include one or more optional input/output (I/O) interfaces 1104, which may enable interfacing with one or more optional input devices 1114 and/or optional output devices 1116. In the example shown, the input device(s) 1114 (e.g., a keyboard, a mouse, a microphone, a touchscreen, and/or a keypad) and output device(s) 1116 (e.g., a display, a speaker and/or a printer) are shown as optional and external to the computer system 1100. In other examples, one or more of the input device(s) 1114 and/or the output device(s) 1116 may be included as a component of the computer system 1100. In other examples, there may not be any input device(s) 1114 and output device(s) 1116, in which case the I/O interface(s) 1104 may not be needed.

The computer system 1100 may include one or more optional network interfaces 1106 for wired (e.g. Ethernet cable) or wireless communication (e.g. one or more antennas) with a network (e.g., an intranet, the Internet, a P2P network, a WAN and/or a LAN).

The computer system 1100 may also include one or more storage units 1108, which may include a mass storage unit such as a solid-state drive, a hard disk drive, a magnetic disk drive and/or an optical disk drive. The computer system 1100 may include one or more memories 1110, which may include both volatile and non-transitory memories (e.g., a flash memory, a random access memory (RAM), and/or a read-only memory (ROM)). The non-transitory memory(ies) 1110 may store instructions for execution by the processing unit(s) 1102 to implement the features and modules and ML models disclosed herein. The memory(ies) 110 may include other software instructions, such as implementing an operating system and other applications/functions.

Examples of non-transitory computer-readable media include a RAM, a ROM, an erasable programmable ROM (EPROM), an electrically erasable programmable ROM (EEPROM), a flash memory, a CD-ROM, or other portable memory storage.

There may be a bus 1112 providing communication among components of the computer system 1100, including the processing unit(s) 1102, optional I/O interface(s) 1104, optional network interface(s) 1106, storage unit(s) 1108 and/or memory(ies) 1110. The bus 1112 may be any suitable bus architecture, including, for example, a memory bus, a peripheral bus or a video bus.

Figure 9:
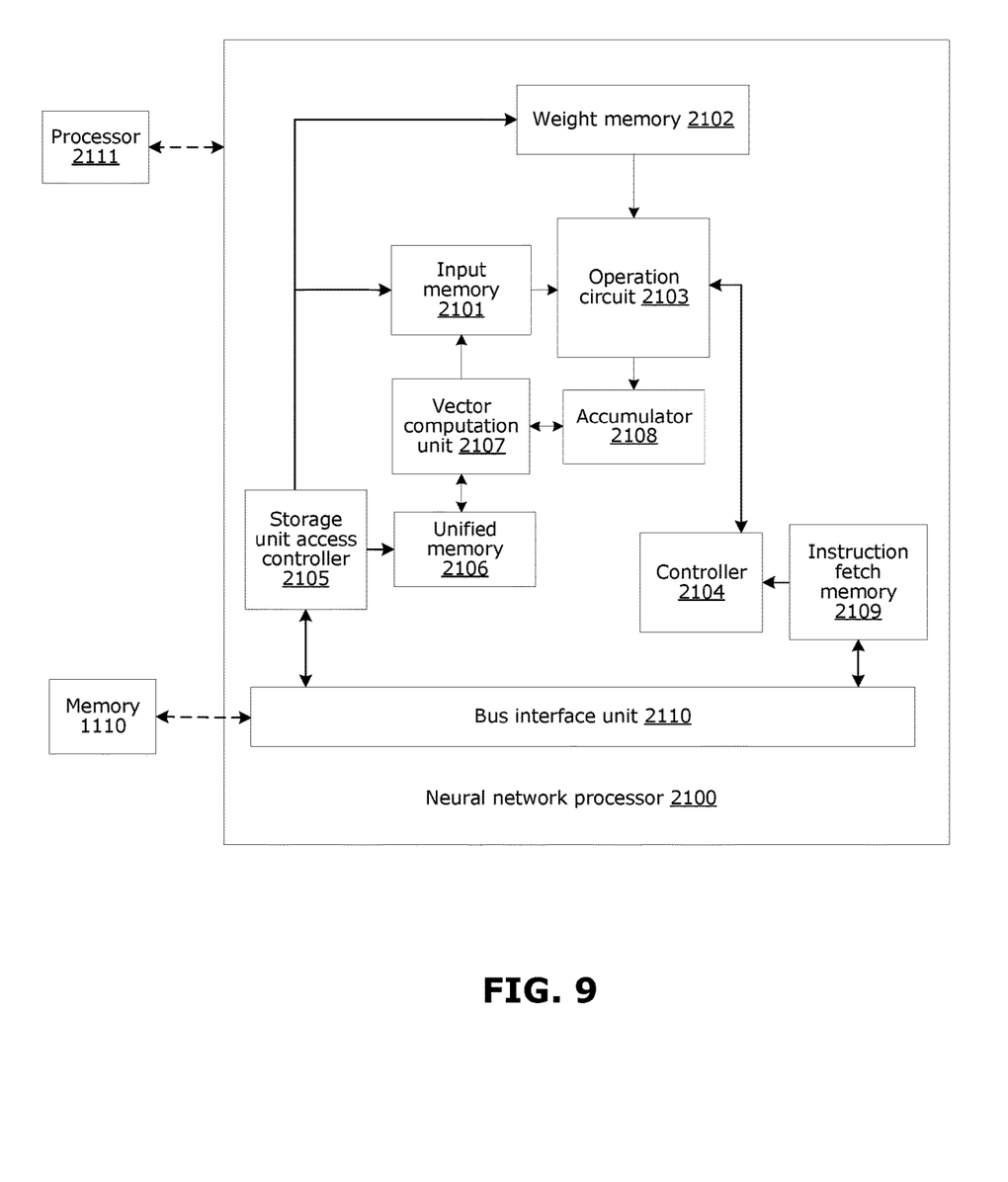
FIG. 9 is a block diagram illustrating an example hardware structure of a NN processor, in accordance with an example embodiment.

FIG. 9 is a block diagram illustrating an example hardware structure of an example NN processor 2100 of the processing unit 1102 to implement a NN model (such as model R) according to some example embodiments of the present disclosure. The NN processor 2100 may be provided on an integrated circuit (also referred to as a computer chip). All the algorithms of the layers of an NN may be implemented in the NN processor 2100.

The processing units (s) 1102 (FIG. 8) may include a further processor 2111 in combination with NN processor 2100. The NN processor 2100 may be any processor that is applicable to NN computations, for example, a Neural Processing Unit (NPU), a tensor processing unit (TPU), a graphics processing unit (GPU), or the like. The NPU is used as an example. The NPU may be mounted, as a coprocessor, to the processor 2111, and the processor 2111 allocates a task to the NPU. A core part of the NPU is an operation circuit 2103. A controller 2104 controls the operation circuit 2103 to extract matrix data from memories (2101 and 2102) and perform multiplication and addition operations.

In some implementations, the operation circuit 2103 internally includes a plurality of processing units (Process Engine, PE). In some implementations, the operation circuit 2103 is a bi-dimensional systolic array. Besides, the operation circuit 2103 may be a uni-dimensional systolic array or another electronic circuit that can implement a mathematical operation such as multiplication and addition. In some implementations, the operation circuit 2103 is a general matrix processor.

For example, it is assumed that there are an input matrix A, a weight matrix B, and an output matrix C. The operation circuit 2103 obtains, from a weight memory 2102, weight data of the matrix B and caches the data in each PE in the operation circuit 2103. The operation circuit 2103 obtains input data of the matrix A from an input memory 2101 and performs a matrix operation based on the input data of the matrix A and the weight data of the matrix B. An obtained partial or final matrix result is stored in an accumulator (accumulator) 2108.

A unified memory 2106 is configured to store input data and output data. Weight data is directly moved to the weight memory 2102 by using a storage unit access controller 2105 (Direct Memory Access Controller, DMAC). The input data is also moved to the unified memory 2106 by using the DMAC.

A bus interface unit (BIU, Bus Interface Unit) 2110 is used for interaction between the DMAC and an instruction fetch memory 2109 (Instruction Fetch Buffer). The bus interface unit 2110 is further configured to enable the instruction fetch memory 2109 to obtain an instruction from the memory 1110, and is further configured to enable the storage unit access controller 2105 to obtain, from the memory 1110, source data of the input matrix A or the weight matrix B.

The DMAC is mainly configured to move input data from memory 1110 Double Data Rate (DDR) to the unified memory 2106, or move the weight data to the weight memory 2102, or move the input data to the input memory 2101.

A vector computation unit 2107 includes a plurality of operation processing units. If needed, the vector computation unit 2107 performs further processing, for example, vector multiplication, vector addition, an exponent operation, a logarithm operation, or magnitude comparison, on an output from the operation circuit 2103. The vector computation unit 2107 is mainly used for computation at a neuron or a layer (described below) of a neural network.

In some implementations, the vector computation unit 2107 stores a processed vector to the unified memory 2106. The instruction fetch memory 2109 (Instruction Fetch Buffer) connected to the controller 2104 is configured to store an instruction used by the controller 2104.

The unified memory 2106, the input memory 2101, the weight memory 2102, and the instruction fetch memory 2109 are all on-chip memories. The memory 1110 is independent of the hardware architecture of the NPU 2100.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices, and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the example embodiments may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this disclosure essentially, or the part contributing to the prior art, or some of the technical solutions may be implemented in a form of a software product. The software product is stored in a storage medium and includes several instructions for instructing a computer device (which may be a personal computer, a server, or a network device) to perform all or some of the steps of the methods described in the embodiments of this application. The foregoing storage medium includes any medium that can store program code, such as a universal serial bus (USB) flash drive, a removable hard disk, a read-only memory (ROM), a random access memory (RAM), a magnetic disk, or an optical disc, among others.

The foregoing descriptions are merely specific implementations but are not intended to limit the scope of protection. Any variation or replacement readily figured out by a person skilled in the art within the technical scope shall fall within the scope of protection. Therefore, the scope of protection shall be subject to the protection scope of the claims.

All published documents identified in the disclosure are incorporated by reference.

The invention claimed is:

1. A method for watermarking prediction outputs generated by a first AI model to enable detection of a target AI model that has been distilled from the watermarked prediction outputs, comprising:
   receiving, at the first AI model, a set of input data samples from a requesting device;
   storing at least a subset of the input data samples to maintain a record of the input data samples;
   predicting, using the first AI model, a respective set of watermarked prediction outputs that each include a probability value, the first AI model using a watermark embedding function to insert a periodic watermark signal in the probability values to generate the watermarked prediction outputs; and
   outputting, from the first AI model, the watermarked prediction outputs including the periodic watermark signal.

2. The method of claim 1 wherein the periodic watermark signal is configured to cause an AI model that is distilled from the respective set of prediction outputs to insert a periodic signal into prediction outputs of the AI model that can be detected as matching the periodic watermark signal.

3. The method of claim 1, further comprising, prior to the predicting, including the watermark embedding function in a preliminary AI model to generate the first AI model.

4. The method of claim 3, wherein the preliminary AI model is an untrained model, the method comprising training the preliminary AI model using a loss that is based on the outputs of the preliminary AI model with the included watermark embedding function.

5. The method of claim 1, comprising defining a key corresponding to the watermark embedding function, the key including a random projection vector, wherein the watermark embedding function inserts the periodic watermark signal based on the random projection vector.

6. The method of claim 5, further comprising determining if the target AI model has been distilled from the first AI model by:
   submitting a query to the target AI model that includes at least some of the stored subset of the input data samples;
   receiving prediction outputs from the target AI model corresponding to the input data samples;
   determining, based on the key, if a periodic signal that matches the periodic watermark signal can be detected in the prediction outputs from the target AI model.

7. The method of claim 6 wherein the key further includes information that identifies a frequency of the periodic watermark signal and a target prediction output to monitor for the periodic watermark signal.

8. The method of claim 1, wherein the watermark embedding function is configured to modify softmax outputs of a softmax layer of the first AI model by inserting the periodic watermark signal into the probability values of the prediction outputs.

9. A method of determining if a target AI model has been distilled from a first AI model by:
   submitting a query to the target AI model that includes input data samples that were previously provided to the first AI model;
   receiving prediction outputs from the target AI model corresponding to the input data samples; and
   determining, based on a predetermined key, if a periodic signal that matches a known periodic watermark signal can be detected in the prediction outputs from the target AI model.

10. The method of claim 9 wherein the determining comprises:
    determining, based on a Fourier power spectrum of the prediction outputs and a projection vector included in the predetermined key, if a signal power that corresponds to the frequency of the known periodic watermark signal can be detected in the prediction outputs from the target AI model.

11. A computer system comprising one or more processing units and one or more non-transient memories storing computer implementable instructions for execution by the one or more processing devices, wherein execution of the computer implementable instructions configures the computer system to perform a method for watermarking prediction outputs generated by a first AI model to enable detection of a target AI model that has been distilled from the watermarked prediction outputs, comprising:
    receiving, at the first AI model, a set of input data samples from a requesting device;
    storing at least a subset of the input data samples to maintain a record of the input data samples;
    predicting, using the first AI model, a respective set of watermarked prediction outputs that each include a probability value, the first AI model using a watermark embedding function to insert a periodic watermark signal in the probability values to generate the watermarked prediction outputs; and
    outputting, from the first AI model, the watermarked prediction outputs including the periodic watermark signal.

12. The computer system of claim 11 wherein the periodic watermark signal is configured to cause an AI model that is distilled from the respective set of prediction outputs to insert a periodic signal into prediction outputs of the AI model that can be detected as matching the periodic watermark signal.

13. The computer system of claim 12 wherein the method includes, prior to the predicting, including the watermark embedding function in a preliminary AI model to generate the first AI model.

14. The computer system of claim 13 wherein the preliminary AI model is an untrained model, the method comprising training the preliminary AI model using a loss that is based on the outputs of the preliminary AI model with the included watermark embedding function.

15. The computer system of claim 13, wherein the method includes defining a key corresponding to the watermark embedding function, the key including a random projection vector, wherein the watermark embedding function inserts the periodic watermark signal based on the random projection vector.

* * * * *

UNITED STATES PATENT AND TRADEMARK OFFICE
CERTIFICATE OF CORRECTION

PATENT NO. : 12,417,394 B2
APPLICATION NO. : 17/204935
DATED : September 16, 2025
INVENTOR(S) : Laurent Charette et al.

It is certified that error appears in the above-identified patent and that said Letters Patent is hereby corrected as shown below:

On the Title Page

Item (73) Inventors: "Yong Zhang, Richmond, CA (US)" should read -- Yong Zhang, Richmond (CA) --

In the Specification

Column 7, Line 49: "$\sum_{i=1}^m q_i=1$" should read -- $\sum_{i=1}^m q_i = 1$ --

Column 7, Line 60-61: "P∈{1, . . . , m}, a watermark signal frequency $f_w \in \mathbb{R}$, and a random unit projection vector $V \in \mathbb{R}^m$, i.e., K = (i*, $f_w$, v)." should read -- $i^* \in \{1, \ldots, m\}$, a watermark signal frequency $f_w \in \mathbb{R}$, and a random unit projection vector $v \in \mathbb{R}^n$, i.e., $K = (i^*, f_w, v)$. --

Column 10, Line 11: "query dataset $\hat{X}^s = \{x^1, \ldots, x^{\tilde{L}}\}$ query data samples for model" should read -- query dataset $\tilde{X}^s = \{x^1, \ldots, x^{\tilde{L}}\}$ query data samples for model --

Column 10, Lines 26-27: "model S for data query dataset $\tilde{S}^s$ can be denoted as $\tilde{Q}^s = \{q^1, \ldots q^{\hat{L}}\}$ where $q^l \in \mathbb{R}^m$ for 1 = 1, . . ., $\tilde{L}$. Each output q" should read -- model S for data query dataset $\tilde{X}^s$ can be denoted as $\tilde{Q}^s = \{q^1, \ldots, q^{\tilde{L}}\}$ where $q^l \in \mathbb{R}^m$ for $l = 1, \ldots, \tilde{L}$. Each output q --

Column 10, Line 32: "the query samples in the data query dataset $\tilde{S}^s$ are" should read -- the query samples in the data query dataset $\tilde{X}^s$ are --

Column 10, Lines 35-39: "sample, label pair)=$(x^l,q^l)$, a respective result pair ($p_l$, $q_{i*}^l$) is extracted, where $p_i$ corresponds to linear projection $p_l=v^T x^l$ as per equation (3), and i* is the target class of model $R_w$ for embedding watermark signals. The result pairs ($p_l$, $q_{i*}^l$) for which is less than a minimum threshold ($q_{i*}^l \leq q_{min}$)" should read -- sample, label pair)= $(x^1, q^1)$, a respective result pair ($p_l$, $q^l_{i*}$) is extracted, where $p_l$ corresponds to linear projection $p_l = v^T x^l$ as per equation (3), and $i^*$ is the target Signed and Sealed this
Twenty-first Day of October, 2025

John A. Squires
*Director of the United States Patent and Trademark Office*

CERTIFICATE OF CORRECTION (continued)
U.S. Pat. No. 12,417,394 B2 class of model $R_w$ for embedding watermark signals. The result pairs ($p_l$, $q^l_{i*}$) for which $q^l_{i*}$ is less than a minimum threshold ($q^l_{i*} \leq q_{min}$) --

Column 10, Lines 43-44: "remaining pairs are re-indexed into evaluation of set $\widetilde{D}^S \{(p_l, q_{i*}^l)\}_{l=, \ldots, \widehat{M}}$." should read -- remaining pairs are re-indexed into evaluation of set $\widetilde{D}^S = \{(p_l, q_{i*}^l)\}_{l=1, \ldots, \widetilde{M}}$ --

Column 10, Line 45: "As indicated in 608, the pairs ($p_l$, $q_{i*}^l$) $\in \tilde{D}^S$ are then used" should read -- As indicated in 608, the pairs ($p_l$, $q^l_{i*}$) $\in \tilde{D}^S$ are then used --

Column 11, Lines 21-28:

"$P_{signal} = \frac{1}{\delta} \int_{f_w - \frac{\delta}{2}}^{f_w + \frac{\delta}{2}} P(f)df$ and $P_{noise} = \frac{1}{F-\delta} \left[ \int_0^{f_w - \frac{\delta}{2}} P(f)df + \int_{f_w + \frac{\delta}{2}}^{F} P(f)df \right]$,"

should read $$P_{signal} = \frac{1}{\delta} \int_{f_w - \frac{\delta}{2}}^{f_w + \frac{\delta}{2}} P(f)df$$

-- and $$P_{noise} = \frac{1}{F-\delta} \left[ \int_0^{f_w - \frac{\delta}{2}} P(f)df + \int_{f_w + \frac{\delta}{2}}^{F} P(f)df \right]$$,--

Column 11, Lines 31 Equation (5): "$P_{STVF} = P_{signal}/P_{noise}$." should read -- $P_{snr} = P_{signal}/P_{noise}$ --

Column 11, Line 44: "$\{x^l, \ldots, x^L\}$ should read -- $\{x^l, \ldots, x^{\tilde{L}}\}$ --